(12) United States Patent
Jacobs (10) Patent No.: US 8,462,950 B2
(45) Date of Patent: Jun. 11, 2013

(54) SYSTEM AND METHOD FOR EXTRACTING, DECODING, AND UTILIZING HIDDEN DATA EMBEDDED IN AUDIO SIGNALS

(75) Inventor: Paul E Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 12/356,736

(22) Filed: Jan. 21, 2009

(65) Prior Publication Data

US 2009/0132391 A1    May 21, 2009

Related U.S. Application Data

(62) Division of application No. 09/805,679, filed on Mar. 13, 2001, now abandoned.

(60) Provisional application No. 60/200,527, filed on Apr. 27, 2000.

(51) Int. Cl.
*H04K 1/00*    (2006.01)

(52) U.S. Cl.
USPC ........... 380/270; 283/113; 382/100; 713/176; 358/3.28

(58) Field of Classification Search
USPC ......................................... 283/113; 358/3.28
See application file for complete search history.

(56) References Cited

U.S. PATENT DOCUMENTS

| | | | |
|---|---|---|---|
| 4,916,691 A | | 4/1990 | Goodman |
| 5,150,113 A | * | 9/1992 | Bluthgen ................ 340/825.69 |
| 5,774,452 A | | 6/1998 | Wolosewicz |
| 5,822,360 A | | 10/1998 | Lee et al. |
| 5,893,903 A | | 4/1999 | Eisdorfer et al. |
| 5,905,800 A | | 5/1999 | Moskowitz et al. |
| 5,940,135 A | | 8/1999 | Petrovic et al. |
| 6,005,501 A | | 12/1999 | Wolosewicz |
| 6,088,586 A | | 7/2000 | Haverty |

(Continued)

FOREIGN PATENT DOCUMENTS

| | | |
|---|---|---|
| EP | 0713301 | 5/1996 |
| EP | 0713335 | 5/1996 |

(Continued)

OTHER PUBLICATIONS

International Search Report—PCT/US2001/13432, International Search Authority—European Patent Office—Jun. 13, 2002.

*Primary Examiner* — April Shan
(74) *Attorney, Agent, or Firm* — Charles D. Brown; Espartaco Diaz Hidalgo (57) ABSTRACT

A system and method for enabling a user to retrieve, decode, and utilize hidden data embedded in audio signals. An exemplary implementation includes a microphone structured to receive sound waves representative of an audio signal and hidden data embedded in the audio signal. The then microphone converts the received sound waves into an electrical output signal. The system also includes a processor electrically coupled to the microphone and configured to receive the electrical output signal in order to extract the hidden data and provide information represented by the hidden data as an output thereof. A user interface is also provided and is electrically coupled to the processor and configured to receive a first input from the user and activate the processor to selectively initiate extraction of the hidden data. The processor produces as an output the information represented by the hidden data. Finally, the system includes a user presentation mechanism configured to present the information to the user.

19 Claims, 10 Drawing Sheets

U.S. PATENT DOCUMENTS

| | | | |
|---|---|---|---|
| 6,125,172 A * | 9/2000 | August et al. | 379/110.01 |
| 6,311,214 B1 | 10/2001 | Rhoads | |
| 6,351,467 B1 | 2/2002 | Dillon | |
| 6,366,876 B1 | 4/2002 | Looney | |
| 6,389,055 B1 | 5/2002 | August et al. | |
| 6,427,064 B1 | 7/2002 | Henderson | |
| 6,456,725 B1 | 9/2002 | Cox et al. | |
| 6,510,234 B1 | 1/2003 | Cox et al. | |
| 6,553,022 B2 | 4/2003 | Hartmaier | |
| 6,737,957 B1 | 5/2004 | Petrovic et al. | |
| 6,870,914 B1 * | 3/2005 | Bossemeyer et al. | 379/142.06 |
| 6,947,571 B1 * | 9/2005 | Rhoads et al. | 382/100 |
| 6,983,255 B2 * | 1/2006 | Linehan | 705/26 |
| 7,058,697 B2 | 6/2006 | Rhoads | |
| 7,142,691 B2 * | 11/2006 | Levy | 382/100 |
| 7,451,177 B1 * | 11/2008 | Johnson et al. | 709/203 |
| 7,545,951 B2 * | 6/2009 | Davis et al. | 382/100 |
| 7,562,392 B1 * | 7/2009 | Rhoads et al. | 726/26 |
| 7,587,602 B2 * | 9/2009 | Rhoads | 713/176 |
| 7,623,422 B2 * | 11/2009 | Kondo | 369/47.1 |
| 2001/0055391 A1 | 12/2001 | Jacobs | |
| 2004/0128514 A1 | 7/2004 | Rhoads | |

FOREIGN PATENT DOCUMENTS

| | | |
|---|---|---|
| JP | 61092068 A | 5/1986 |
| JP | 4334227 A | 11/1992 |
| JP | 8149163 A | 6/1996 |
| JP | 8289042 A | 11/1996 |
| JP | 9069820 A | 3/1997 |
| JP | 10155151 A | 6/1998 |
| JP | 2000050048 A | 2/2000 |
| JP | 2002501325 T | 1/2002 |
| JP | 2002504272 T | 2/2002 |
| WO | WO9935771 | 7/1999 |
| WO | WO0106686 | 1/2001 |

* cited by examiner

SYSTEM AND METHOD FOR EXTRACTING, DECODING, AND UTILIZING HIDDEN DATA EMBEDDED IN AUDIO SIGNALS

CROSS REFERENCE TO RELATED APPLICATIONS

This application is a divisional of application Ser. No. 09/805,679, filed on Mar. 13, 2001, which claims the benefit of U.S. Provisional Application No. 60/200,527, filed Apr. 27, 2000, the entire contents of which is incorporated herein by reference.

BACKGROUND OF THE INVENTION

1. Field of the Invention

This invention generally relates to the field of encoding and decoding hidden data in electronic signals. More particularly, the present invention relates to a system and method for enabling a user to retrieve, decode, and utilize hidden data embedded in audio signals.

2. Description of Related Art

Generally, technology for embedding hidden data in electronic signals is well known in the art. One such technology is known as digital watermarking. Digital watermarking technology has developed along with the need to devise more effective ways for protecting copyrights of images and music made available to the public through the Internet.

In digital watermarking, a watermark is embedded in spectral components of a data signal using, for example, spread spectrum techniques. This watermark, which is actually hidden information streams, is primarily used to protect against illegal use of proprietary images and/or music produced in the form of electronic signals. The watermark is virtually impossible to remove and is integrated throughout the signal. Digital watermarking is therefore particularly effective for protecting and tracking the use of electronic images and music. Although the watermark is not perceptible to human senses, it can be detected electronically using a variety of different detection and retrieval techniques. One particularly beneficial use of this technology is the ability to watermark audio signals. In this capacity, watermarks can be used by commercial industry, for example, to protect against the illegal use of copyright protected songs or to monitor the use and broadcast of commercials.

In traditional applications of watermarking, watermarks are added to a piece of music, or a commercial, for example, at various points in the recording and/or distribution cycle. In a song, a watermark might be added at the studio and may contain the name of the studio, date and names of the musicians, and their copyright statement. Another watermark may be added by the record company, containing their copyright statement, when a compact disk (CD) is created. Finally, another watermark could be added by the radio station when the CD or commercial is played and broadcast. Although inaudible to the listener, the virtually indestructible watermark remains in the audio associated audio signal. That is, the watermark remains embedded in the electronic version of the song or commercial.

At any point where a user can hear the music, such as when the music is reproduced through an audio speaker, the listener would be able to decode the embedded watermark with the proper equipment. In the case of broadcast music, the decoded watermark could provide the user with the name of a particular song, and the name of the record company. The watermark could also provide the call letters of the radio station and any other information added to the watermark along the recording and/or distribution cycle of the associated audio signal. The ability to decode watermarks in this manner also provides a means to monitor the use, and/or amount of airplay of materials such as radio commercials.

As mentioned above, techniques for embedding hidden information in data signals are well known in the art. For example, U.S. Pat. No. 5,822,360, issued to Lee et al. on Oct. 13, 1998 describes one such method. In Lee, auxiliary data is transported in an audio signal by hiding the data in the form of colored noise. Colored noise has a signal spectrum similar to the audio signals. Thus, the auxiliary data is first converted to a spread spectrum signal and the resulting audio signal is analyzed to determine its spectral shape. The same spectral shape is then imparted to the spread spectrum signal, which is combined with the audio signal for transmission. The spectral shaping can be performed using techniques such as linear predictive coding or sub-band coding techniques such as fast Fourier transforms.

Another technique for embedding a watermark in a signal is disclosed in U.S. Pat. No. 5,905,800, issued to Moskowitz et al. on May 18, 1999. In Moskowitz, first a watermark key is identified. The key includes a binary sequence and information describing application of the binary sequence to the signal. The digital watermark is then encoded within the content signal at one or more locations by the watermarking key.

Similarly, a number of prior art approaches are available for decoding an embedded watermark from an audio signal. One technique requires the audio signal to first be broadcast through an audio speaker, such as a radio speaker, in the form of sound waves. Since the watermark is inaudible to humans, a microphone is used to receive the associated sound waves and convert the received sound waves into an electrical signal. Next, the electrical signal is analyzed, using prior art signal processing techniques, in order to locate and decode the watermark and retrieve the information embedded therein. As mentioned above, the information could be the name of a song, the name of an associated record company, the call letters of the radio station, information regarding a broadcast commercial, and/or any other type of information.

Given the increased dependence on wireless communications, there is a need to integrate the use of digital watermarking into the wireless communications arena. In this regard, there is also a need for a system and method that provides a user with the ability to detect and decode a watermark and/or other information hidden in an audio signal and present the decoded information to an end user.

SUMMARY OF THE INVENTION

Consider the business models created if a portable device, such as a wireless phone, was capable of decoding watermarks and presenting the resulting information to an end user. By way of example, a person could hear an advertisement or song of interest over a radio, while riding along in an automobile. In this particular example, the listener may desire to purchase an advertised product or may desire more information about the song, or the performing artist, such as where the artist will be performing in concert.

In order to obtain this information, the user could activate his mobile communication device, e.g. a wireless phone, and push a designated "more information" button on the phone. The wireless phone would be equipped with hardware and electronic circuitry that receives the sound heard through speakers of the automobile's radio. The wireless phone circuitry would process the audio signal and decode the watermark in order to extract certain encoded information. The encoded information includes contact information such as a phone number or an Internet uniform resource locator (URL) address associated with the song or commercial broadcast over the radio. That information is then displayed to the user in order to facilitate placement of a phone call to a designated phone number or to establish an Internet link using the URL. The user could then either speak to an operator, or interact with the web site in the usual manner, requesting concert information and/or ordering the product. The revenue stream associated with the transaction can be tracked and shared among the various entities participating in such an environment.

Consistent with the principles of the present invention as embodied and broadly described herein, an exemplary embodiment comprises a microphone structured to receive sound waves representative of (i) an audio signal and (ii) hidden data embedded in the audio signal. The microphone converts the received sound waves into an electrical output signal. The system includes a processor electrically coupled to the microphone and configured to receive the electrical output signal in order to extract the hidden data and provide information represented by the hidden data as an output thereof. A user interface is also provided. The user interface is electrically coupled to the processor and configured to (i) receive a first input from the user and (ii) activate the processor to selectively initiate extraction of the hidden data in accordance with the first user input. The processor produces as an output the information represented by the hidden data. Finally, the system includes a user presentation mechanism configured to present the information represented by the hidden data to the user.

BRIEF DESCRIPTION OF THE DRAWINGS

The accompanying drawings, which are incorporated in and constitute a part of this specification, illustrate preferred embodiments of the invention and, together with the description, explain the objects, advantages, and principles of the invention. In the drawings.

DETAILED DESCRIPTION OF PREFERRED EMBODIMENTS

The following detailed description refers to the accompanying drawings that illustrate exemplary embodiments consistent with the present invention. Other embodiments are possible and modifications may be made to the embodiments without departing from the spirit and scope of this invention. Therefore, the following detailed description is not meant to limit the invention solely to the embodiments described.

Figure 1:
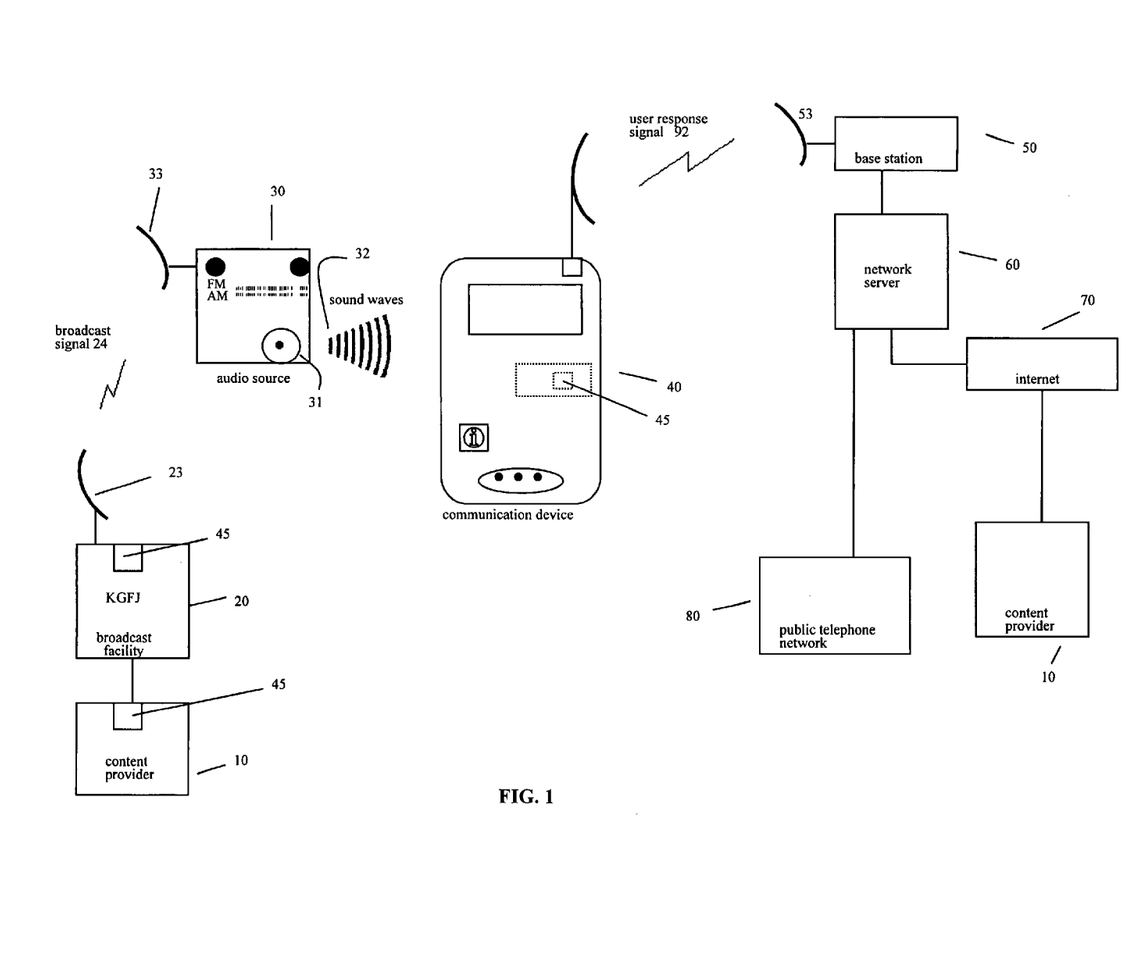
FIG. 1 is a diagram of a business model in accordance with an embodiment of the present invention.

FIG. 1 illustrates a business model in accordance with an embodiment of the present invention. In particular, FIG. 1 shows a number of components, content providers 10, broadcast facility 20, an audio source 30, a communication device 40, and a base station 50. Also included is a network server 60, access to the Internet 70, and a public telephone network 80. Each of these components is discussed in greater detail below.

The content provider 10 may, for example, be a record company or recording studio. The content provider 10 creates recording media, which includes audio information of interest to a system user such as songs or other material. As shown in greater detail in FIG. 2, the content provider 10 first creates content information, such as an original audio signal 11, created from a recording session of a musical artist. The audio signal 11 may be an electronic representation of a particular song, for example, the song Southern California, recorded by the musical Group Maze. Next, using techniques well known in the art and discussed above, a watermark 12 is created for embedding additional information in the audio signal 11. The watermark 12 may include, by way of example, identification (ID) information representing the name of the song, the performing artist, the name of a retail outlet where the song can be purchased, or the copyright owner's information etc. The watermark 12 may also include linking information, such as a phone number or URL in order to facilitate the user's direct purchase of the song or advertised products, or to facilitate some other interaction or transaction with the user.

Figure 2:
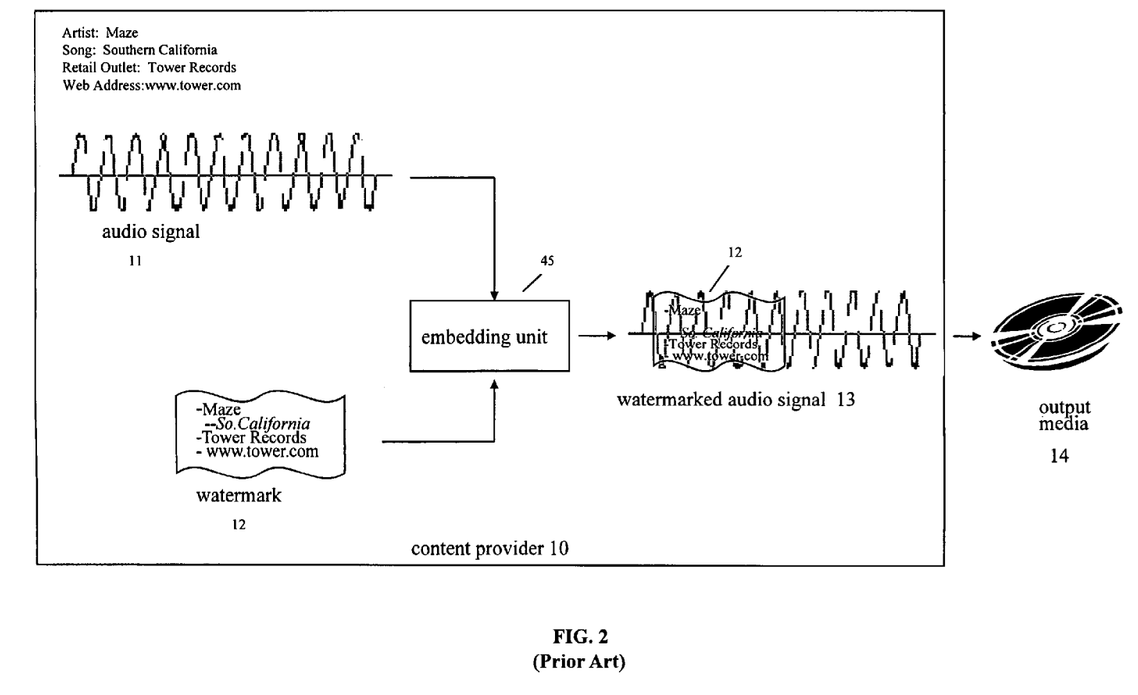
FIG. 2 is an illustration of a prior art system for providing a watermark in an audio signal at a content provider location.

An embedding unit 45, that embodies the known watermarking techniques, receives the audio signal 11 and the watermark 12 as inputs, and hides or embeds the watermark 12 in the audio signal 11. Thus, the embedding unit 45 produces as an output, a watermarked audio signal 13. When the embedding process has been completed, the content provider 10 records the song and produces and output media 14, such as a CD, which contains the watermarked audio signal 13. As seen in FIG. 1, an embedding unit 45 may also be included in the broadcast facility 20, and the communication device 40.

Figure 3:
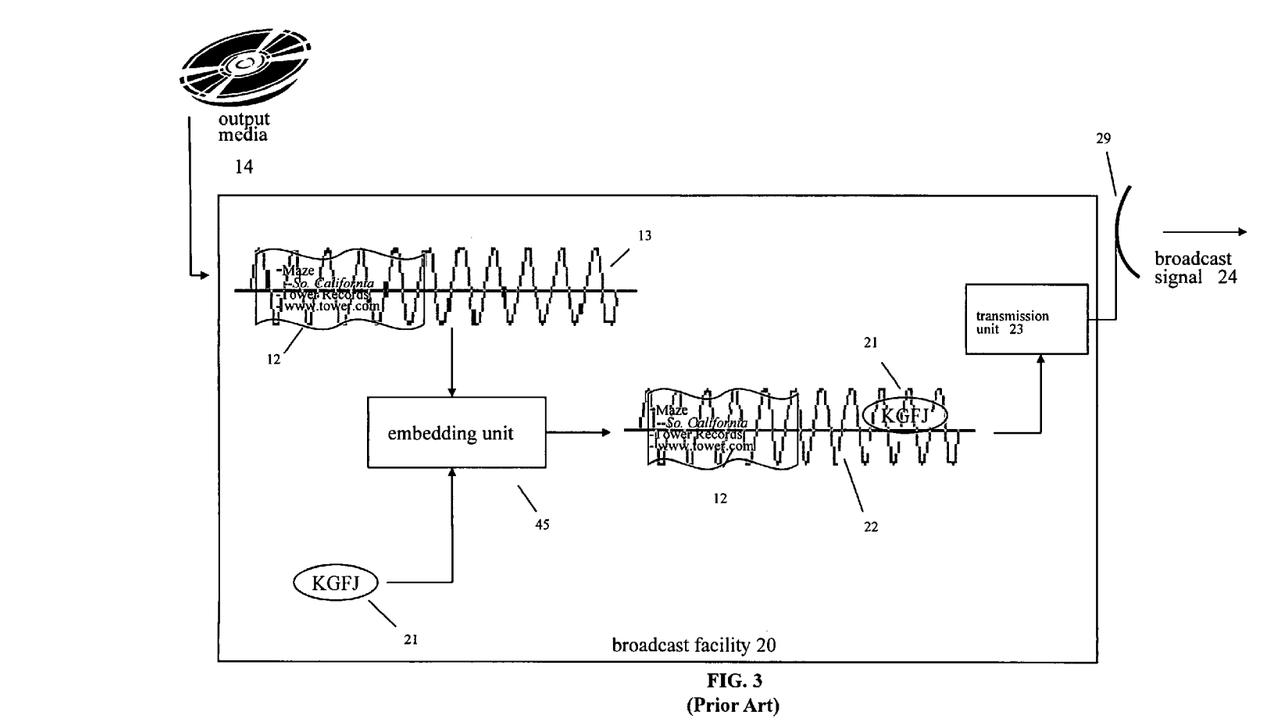
FIG. 3 is an illustration of a prior art system for providing a watermark in an audio signal at a broadcast facility.

The content provider 10 then supplies the output media 14 to the broadcast facility 20, such as a radio station having, for example, the call letters KGFJ. As shown in FIGS. 1 and 3, the broadcast facility 20 receives the output media 14 for broadcast over the airways. Further, the broadcast facility 20 may desire to add its own watermark 21, which could include the radio station's call letters KGFJ. Thus, the broadcast facility 20 uses its embedding unit 45 to receive the watermarked audio signal 13 and watermark 21, as inputs. The embedding unit 45 produces as an output, signal 22, which includes the original watermark 12 and the new watermark 21. A transmission unit 23 within the broadcast facility 20, such as a transmitter, may then convert the signal 22 into an appropriately formatted broadcast signal 24. Once converted, the broadcast facility 20 may then radiate the broadcast signal 24 from the antenna 29 for broadcast over the airways. The broadcast signal 24 could be, for example, a radio frequency (RF) or microwave signal.

Referring again to FIG. 1, a user traveling in an automobile (not shown), may be listening to an audio source 30, such as a radio in the automobile. Although the audio source 30 of the present exemplary embodiment is a radio, the audio source alternatively could be a television 38, a public address (PA) system 39 etc.

Figure 4:
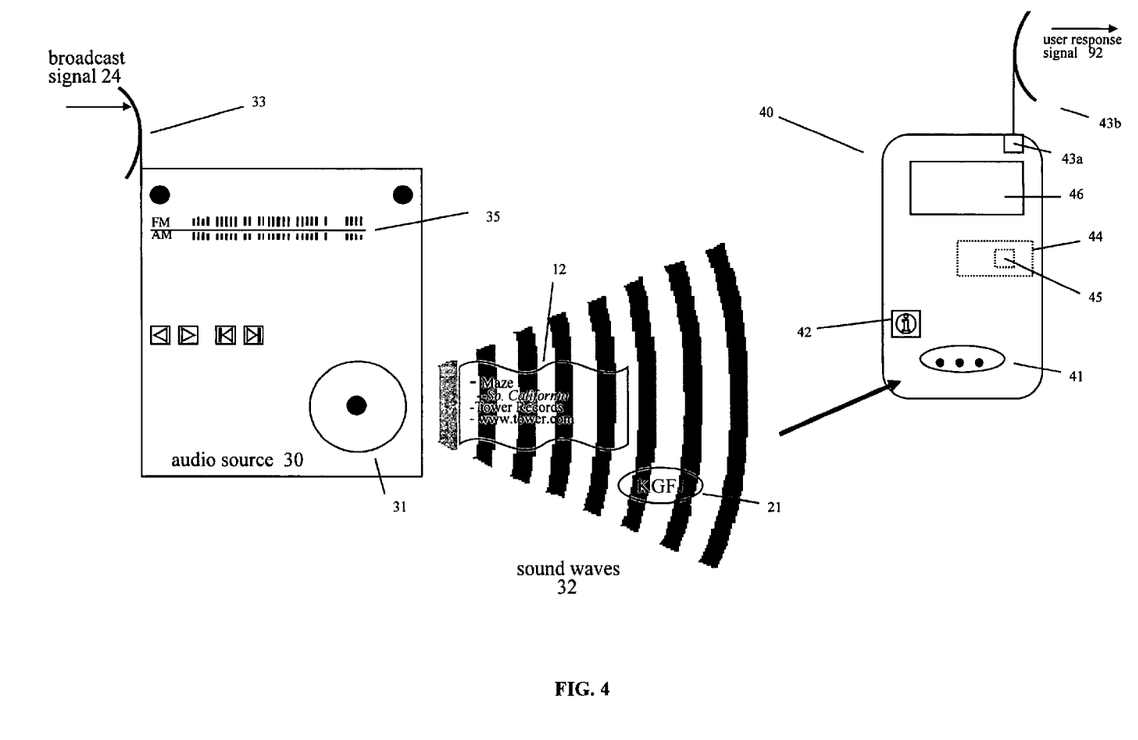
FIG. 4 is an illustration of an exemplary communication device and one audio signal source.

Next, and as indicated more clearly in FIG. 4, the audio source 30 receives the broadcast signal 24 through an antenna 33. When the user tunes a dial 35 of the audio source 30 to an operating frequency of the broadcast facility 20, circuit components (not shown) of the audio source 30 demodulate the broadcast signal 24 to retrieve an information signal. As known in the art, the information signal is converted into an appropriately formatted electrical signal, and provided to speaker 31. The speaker 31 then converts the electrical signal into sound waves 32 that the user hears in the form of the song Southern California. The sound waves 32 are thus representative of signal 22, shown in FIG. 3, which includes the watermarks 12 and 21. Although the user can hear the song produced by the sound waves 32, the user cannot hear the watermarks 12 and 21, which are also embedded in the sound waves 32.

As the user listens to the song through the speaker 31, the user may not be aware of the name of the song or other specifics regarding any other audio content, such as a commercial. The user may, however, desire to know the name of the song, the performing artist, and/or may desire to purchase a copy of the song or an advertised product. The user may also desire to know the call letters of the broadcast facility 20 that broadcast the song. In an exemplary embodiment of the present invention, and as illustrated in FIG. 1, the user is provided with a communication device 40 to obtain the desired information and/or order a copy of the CD or other material.

Communication device 40 could be any device that has a microphone capable of receiving the sound waves 32 from the audio source 30, and a processor (e.g. processor 44 in FIG. 6) for extracting watermarks from received sound waves. Although in the exemplary embodiment of FIG. 1, the communication device 40 is a wireless phone, other devices, such as a lap top computer or a personal digital assistant (PDA), could be used.

Referring again to FIG. 4, the communication device 40 includes a user interface 42 for permitting a user to either activate an information mode or enter choices regarding displayed information. For example, if the user desires additional information regarding a song or advertisement heard through the speaker 31, the user can activate the user interface 42 to request additional information regarding the song or advertisement. The additional information would be presented to the user on a display 46. Additionally, instead of displaying all available information, the user could select only a representative portion for presentation on the display 46. After the additional information is presented to the user, the user interface 42 may also be operated to make specific selections pertaining to the information presented. A menu scheme can be implemented using the display 46 and the user interface 42 to facilitate selection of specific items included in the information. When the user first operates interface 42, a microphone 41 becomes active to receive the sound waves 32 and convert the sound waves 32 into an electrical signal. The communication device 40 is now set to extract the ID and linking information from the watermarks 12 and 21, shown in FIGS. 4 and 6-7.

Figure 5:
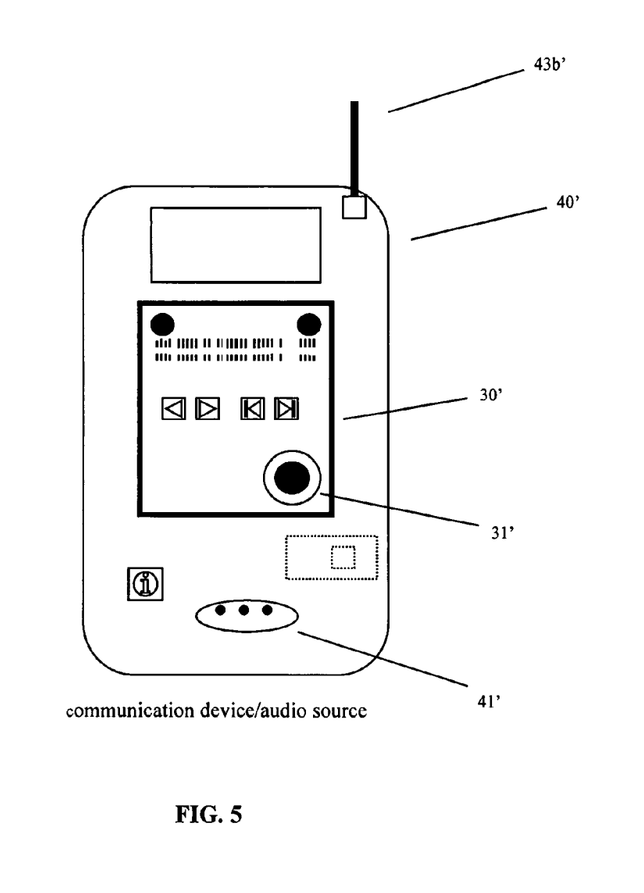
FIG. 5 is an illustration of an audio source included in the communication device.

In an alternative embodiment, an audio source could be embedded in a communication device. In FIG. 5, for example, a communication device 40' such as a cell phone, includes an audio source 30', such as a radio. In this arrangement, the communication device 40' could directly receive the broadcast signal 24 through an antenna 43b'. Here, sound waves need not be produced by a speaker 31' and then received by a microphone 41' prior to extraction of the ID and linking information from the watermarks in broadcast signal 24, as done in the embodiment of FIG. 4. The communication device 40' instead can be configured to demodulate the broadcast signal 24, properly format the demodulated signal, and provide the formatted signal as a direct input to a processor 44 (shown in FIG. 6). From this point, the communication device 40' would operate the same as communication device 40 in terms of extracting the ID and linking information from the watermarks embedded in broadcast signal 24.

Figure 6:
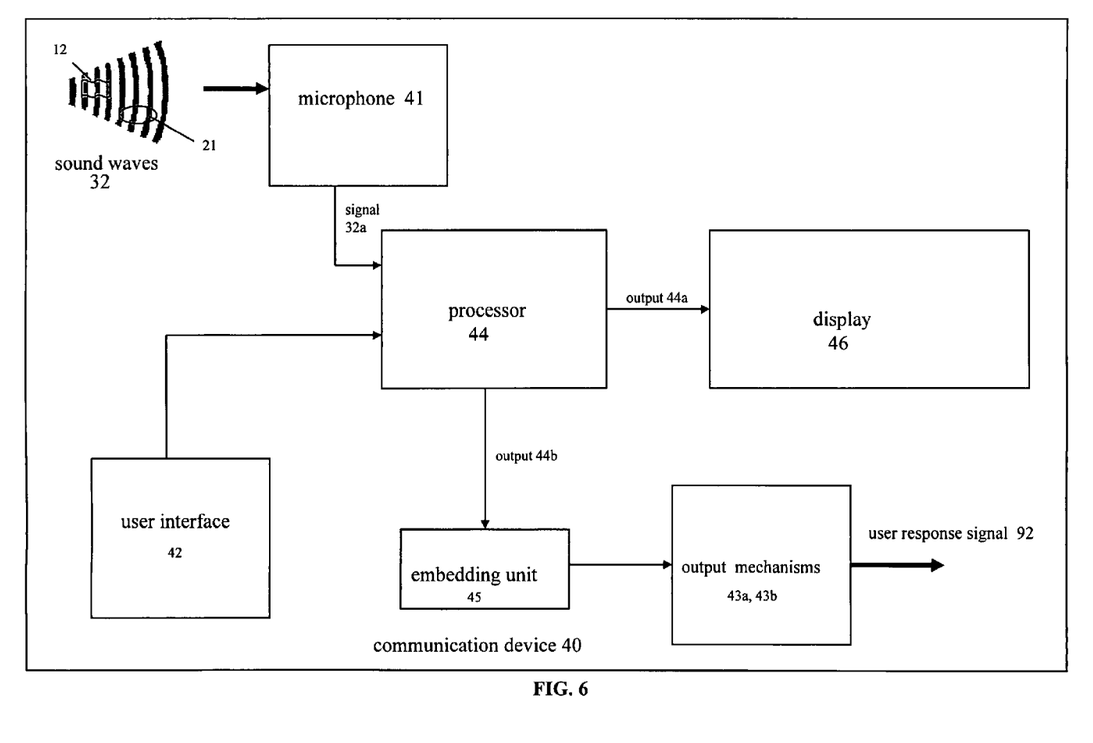
FIG. 6 is a functional block diagram of an exemplary communication device.

FIG. 6 is a block diagram illustrating an exemplary implementation of the communication device 40 shown in FIG. 4. In FIG. 6, the microphone 41 is electrically coupled, at least indirectly, to a processor 44. The processor 44 is operable to extract and decode the watermarks 12 and 21, display the associated ID & linking information and/or activate a network link in order to facilitate interaction with an entity associated with the watermarks (e.g., purchase of a CD or other advertised product). The microphone 41 receives the sound waves 32, and converts them into an electronic output signal 32a. Signal 32a is then provided to the processor 44. The user interface 42 of the communication device 40 is also coupled to the processor 44. The processor 44 provides an information output 44a to a display 46 and can also be configured to provide a linking output 44b to an embedding unit 45 for embedding additional watermarks. The embedding unit 45 of the communication device 40 provides an output signal to output mechanisms 43a and 43b. Output mechanisms 43a and 43b, as commonly used in wireless phones, may be a transmitter and an antenna respectively.

The invention, however, is not limited to use of output mechanisms 43a and 43b, and can be practiced with alternative forms of output mechanisms. In response to the output signal produced by the embedding unit 45 of the communication device 40, a user response signal 92 is produced and radiated from the antenna 43b. The user response signal 92 includes the user's response to the information displayed on the display 46. Specifically, this information may include the user's credit card number and/or other pertinent information required to interact with the entity associated with the watermark 12 or 21 (e.g., to purchase the CD or other advertised product). The user response signal 92, formatted for transmission across a wireless link, can also include the watermark added by the embedding unit 45 of the communication device 40.

Figure 7:
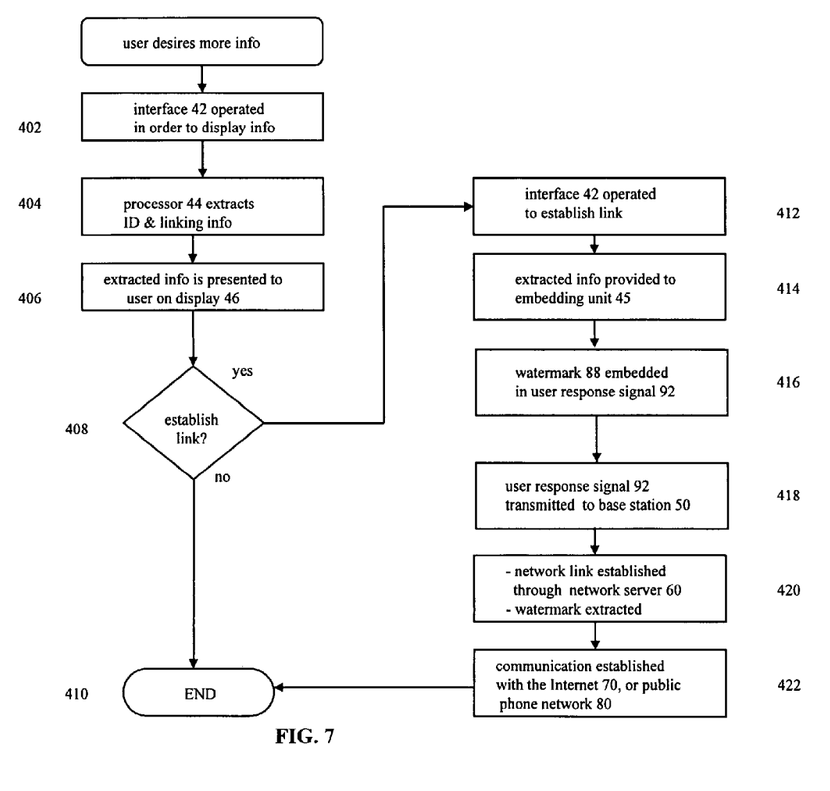
FIG. 7 is a flow diagram of the operation of an exemplary processor.

FIG. 7 illustrates the internal operation of the communication device 40. As mentioned above, when the user desires additional information regarding a song, advertised product, or other information heard over the speaker 31, the user operates the user interface 42, as shown in block 402 of FIG. 7. This process is shown also in FIGS. 4 and 6. When the interface 42 is operated, the processor 44 receives the electrical signal from the microphone 41 and extracts the ID and linking information as indicated in block 404 of FIG. 7.

Figure 8:
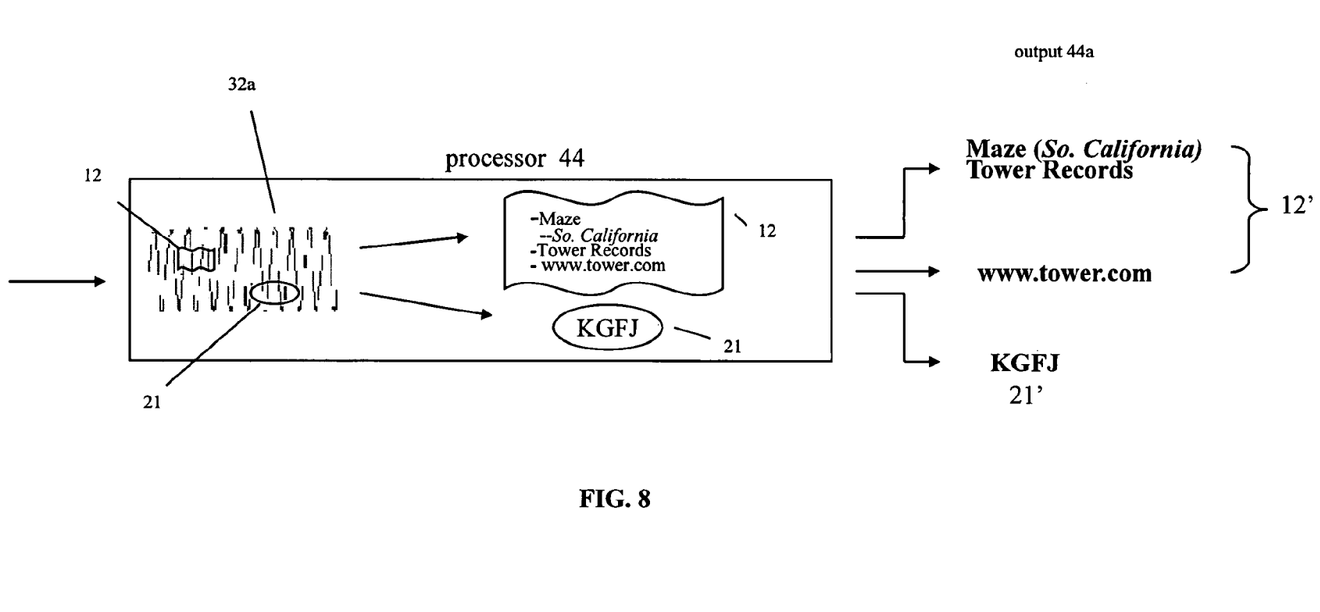
FIG. 8 is an illustration of a processor operating in accordance with the present invention.
Figure 9:
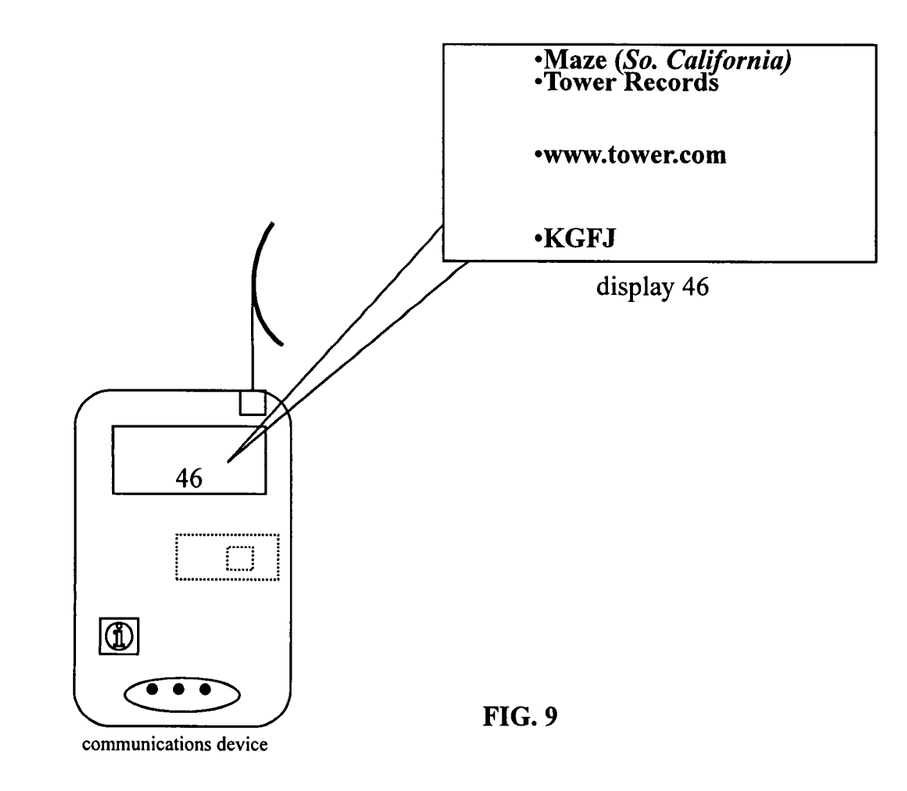
FIG. 9 is an illustration of a display presenting decoded watermark information to a user.

FIG. 8 provides a more detailed view of the extraction process of the processor 44. As shown, the electrical signal 32a, representative of the sound waves 32 and containing the watermarks 12 and 21 is received as an input to the processor 44. The processor 44, using one or more techniques known in the art, removes the watermarks from the signal 32a. In block 406, the processor 44 then produces the output 44a, which includes the ID information and the linking information formatted for presentation on the display 46. Thus, watermark 12, containing ID information in the form of the name of the performing artist, and the name of the song, and linking information in the form of a web site, are presented as the output 44a in an exemplary format 12'. Similarly, watermark 21, also including ID information, is presented in an exemplary format 21'. Information in the formats 12' and 21' is then presented to the user on the display 46 as indicated in block 406 of FIG. 7, and as illustrated in FIG. 9. The user may now decide whether to utilize the linking information presented on the display 46, in order to actually establish a communications link with the associated entity (e.g., in order to purchase the CD or another advertised product).

As shown in block 408 of FIG. 7, if the user merely desires to view the ID information and does not wish to establish a communication link, the process ends in block 410. On the other hand, if the user desires to have the communication device 40 utilize the displayed linking information to establish a communications link, the user may so indicate by operating the user interface 42 as indicated in block 412. An established communication link will permit the communication device 40 to automatically dial a displayed phone number, using for example, the public telephone network 80 shown in FIG. 1. Alternatively, the communication link may also permit the communication device 40 to contact an Internet web site which can be displayed, for example, as a URL. When the communications link is actually established, the communication device 40 transmits the user response signal 92, which is then received by an antenna 53 connected to a network resource device, such as the wireless communication network base station 50, shown in FIG. 1.

Prior to the communication link being established, the user and/or manufacturer of the communication device 40 may desire to add additional information to the processor output 44b. For example, the manufacturer may desire to embed a serial number of the communication device 40 so that the manufacturer may collect his share of the revenue as compensation for providing a communication device with the capability to extract embedded information. Additionally, a wireless service provider may also desire to collect revenues for providing a wireless network embodied with the features discussed above. To this end, any party in the system that provides a service (e.g., the artist, the CD provider, the radio station, the receiver manufacturer, the communication device manufacturer or service provider, and/or the like) may be provided with the capability to embed watermarks or other information for purposes such as revenue sharing.

Figure 10:
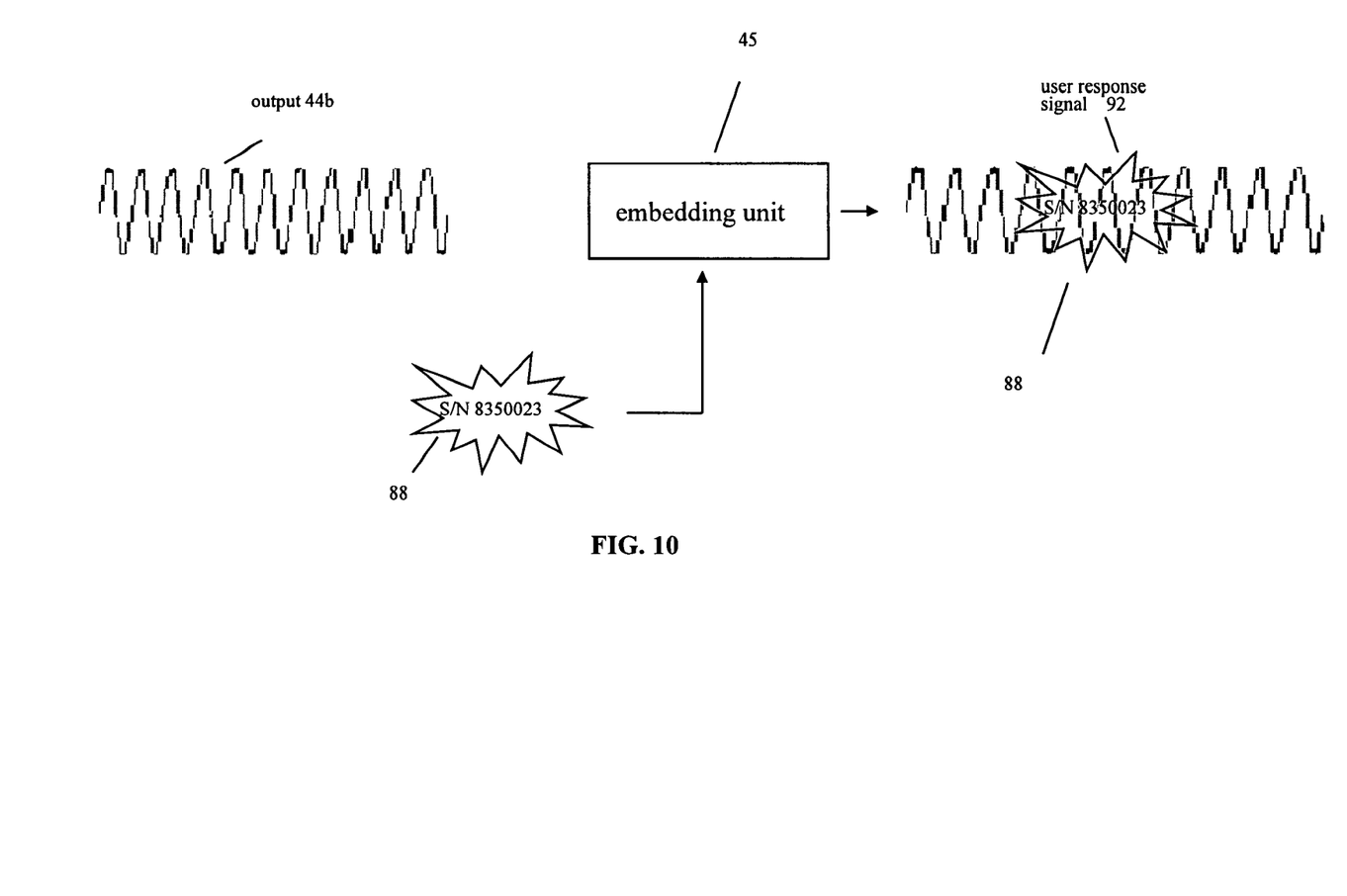
FIG. 10 is an illustration of an exemplary communication device embedding an additional watermark in an information signal.

FIG. 10 illustrates the embedding of an additional watermark. To embed the additional watermark, the output 44b of the processor 44 is first provided to the embedding unit 45 of communication device 40, as indicated in block 414 of FIG. 7. In block 416, a watermark 88 is then added to the user's selection. Here, the embedding unit 45 of the communication device 40 receives as inputs, output 44b from the processor 44 and the watermark 88. The embedding unit 45 of the communication device 40 then provides an output response 92, which includes the user's product selection and the watermark 88. As shown in block 418, the response signal 92 is then transmitted to the base station 50 of FIG. 1. The base station 50 receives the user response signal 92 and extracts the serial number information from the signal 92. The base station 50 also establishes a communications network connection through network server 60 as indicated in block 420 and shown in FIG. 1. The base station 50 uses the manufacturer and/or the wireless service provider's information to allocate revenue according to previously negotiated agreements. Finally, the actual purchase of any product accomplished using the communication device 40 and the base station 50 may be billed to the user in a manner similar to conventional Internet purchases.

The network server 60 facilitates communication by the communication device 40 with the entity identified by the URL provided in watermark 12. Thus, the user is able to use the communication device 40 to extract and decode the watermark 12 from his automobile, establish a link with the associated web site using the Internet 70 and, for example, order a CD or the advertised product, or otherwise interact with that web site. Correspondingly, content provider 10 may also transmit web page information through the Internet 70 back to the communication device 40 for presentation on the display 46. Alternatively, the network server 60 can establish a communication link between the communication device 40 and a public telephone network 80, if a telephone number was provided in the linking information instead of a web address, as indicated in block 422 and shown in FIG. 1. The user then can interact with the entity that answers that telephone at the opposite end of the established communication link.

The foregoing description of the preferred embodiments provides an illustration and description, but is not intended to be exhaustive or to limit the invention to the precise form disclosed. Modifications and variations are possible consistent with the above teachings or may be acquired from practice of the invention. The foregoing exemplary implementations thus provide a convenient way of extracting hidden data from audio signals and/or interacting with an associated entity. Various implementations may include a non-transitory program storage medium having computer executable instructions stored thereon, which may be executed by a computer to perform steps in accordance with the above teachings.

The invention claimed is:

1. An electronic system, comprising:
   a receiver configured to receive a radio frequency signal comprising hidden data;
   a hardware processor configured to extract the hidden data;
   a presentation mechanism configured to display the hidden data upon said extraction;
   a software user interface configured to initiate said extraction, and select a representative portion of the extracted hidden data for display by the presentation mechanism;
   a hardware output mechanism configured to establish a communications link with an entity associated with the hidden data, and to transmit a user response signal indicative of a user's response to the extracted hidden data displayed on the presentation mechanism; and
   an embedding hardware unit configured to embed the user response signal with third-party information for purposes of revenue sharing between a plurality of third parties.

2. The system of claim 1, wherein the receiver is a microphone.

3. The system of claim 1, wherein the hidden data comprises an internet uniform resource locator (URL) address.

4. The system of claim 1, wherein the presentation mechanism is a visual display that employs a menu scheme to facilitate selection of a portion of the hidden data.

5. The system of claim 1, wherein the output mechanism comprises a transmitter and an antenna, and wherein the communications link comprises wireless communication.

6. The system of claim 1, wherein the entity is a content provider.

7. The system of claim 5, wherein the user response signal comprises a user's purchasing selection related to the extracted hidden data.

8. The system of claim 7, wherein the embedding unit is configured to embed the user response signal with identification information associated with the system.

9. The system of claim 8, wherein the identification information associated with the system is a serial number of the system.

10. The system of claim 8, wherein the identification information facilitates allocation of revenue generated from the user's purchasing selection.

11. An electronic system, comprising:
a receiver configured to receive a radio frequency signal comprising hidden data;
a hardware processor configured to extract the hidden data;
a presentation mechanism configured to display the hidden data upon said extraction;
a software user interface configured to initiate said extraction, and select a representative portion of the extracted hidden data for display by the presentation mechanism;
a hardware output mechanism configured to establish a communications link with an entity associated with the hidden data, and to transmit a user response signal indicative of a user's response to the hidden data displayed on the presentation mechanism; and
an embedding hardware unit configured to embed the user response signal with third-party information for purposes of revenue sharing between a plurality of third parties.

12. The system of claim 11, wherein the embedding unit is configured to embed the user response signal with identification information associated with the system, and wherein the user response signal comprises a user's purchasing selection related to the extracted hidden data.

13. The system of claim 12, wherein the identification information facilitates allocation of revenue generated from the user's purchasing selection.

14. A method of displaying hidden data implemented by a communication device, the method comprising:
receiving a radio frequency signal comprising hidden data;
extracting the hidden data upon instruction from a user interface;
displaying the hidden data upon said extraction;
selecting a representative portion of the extracted hidden data for display;
establishing a communications link with an entity associated with the hidden data;
transmitting a user response signal indicative of a user's response to the displayed hidden data from a user device to the entity; and
prior to transmitting, embedding the user response signal with third-party information for purposes of revenue sharing between a plurality of third parties.

15. The method of claim 14, further comprising embedding the user response signal with identification information, wherein the user response signal comprises a user's purchasing selection, and wherein the identification information facilitates allocation of revenue generated from the user's purchasing selection.

16. A hardware processor configured to:
receive a radio frequency signal comprising hidden data;
extract the hidden data upon instruction from a user interface;
display the hidden data upon said extraction;
select a representative portion of the extracted hidden data for display;
establish a communications link with an entity associated with the hidden data;
transmit a user response signal indicative of a user's response to the displayed hidden data from a user device to the entity; and
embed the user response signal with third-party information for purposes of revenue sharing between a plurality of third parties.

17. The hardware processor of claim 16, further configured to embed the user response signal with identification information associated with the system, wherein the user response signal comprises a user's purchasing selection, and wherein the identification information facilitates allocation of revenue generated from the user's purchasing selection.

18. A non-transitory program storage medium having computer executable instructions stored thereon, which when executed perform the following:
receiving a radio frequency signal comprising hidden data;
extracting the hidden data upon instruction from a user interface;
displaying the hidden data upon said extraction;
selecting a representative portion of the extracted hidden data for display;
establishing a communications link with an entity associated with the hidden data;
transmitting a user response signal indicative of a user's response to the displayed hidden data from a user device to the entity; and
prior to transmitting, embedding the user response signal with third-party information for purposes of revenue sharing between a plurality of third parties.

19. The non-transitory medium of claim 18, further performing the steps of embedding the user response signal with identification information, wherein the user response signal comprises a user's purchasing selection, and wherein the identification information facilitates allocation of revenue generated from the user's purchasing selection.

* * * * *